June 26, 1934.  A. H. GILKESON ET AL  1,963,990
ELECTRICALLY HEATED GOGGLES
Filed Aug. 24, 1932
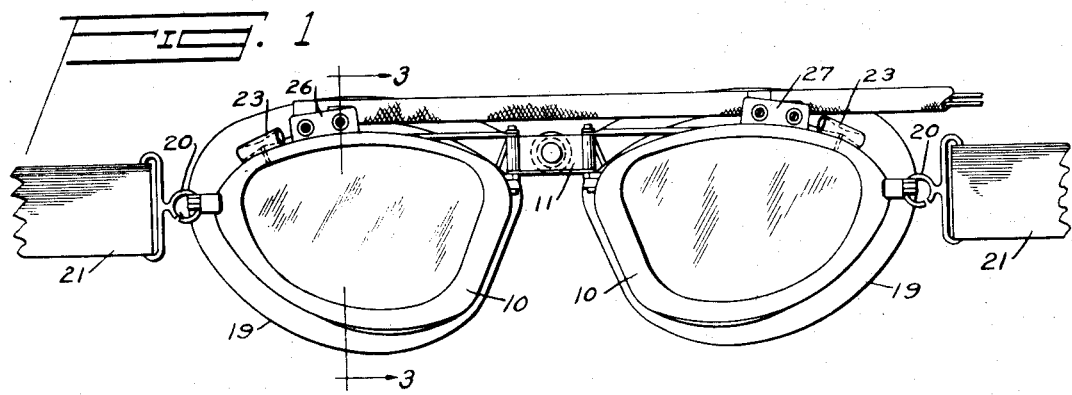
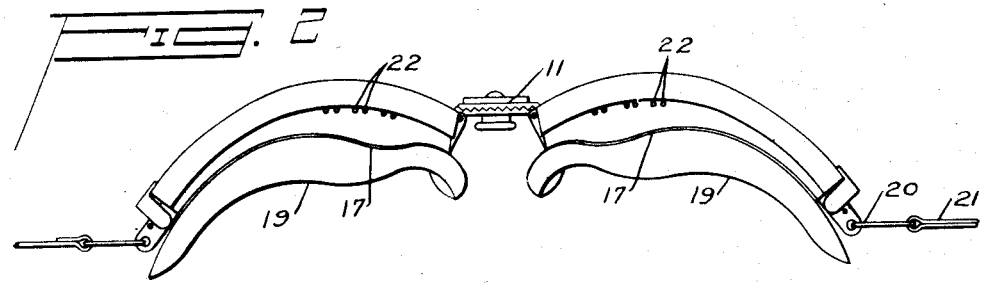
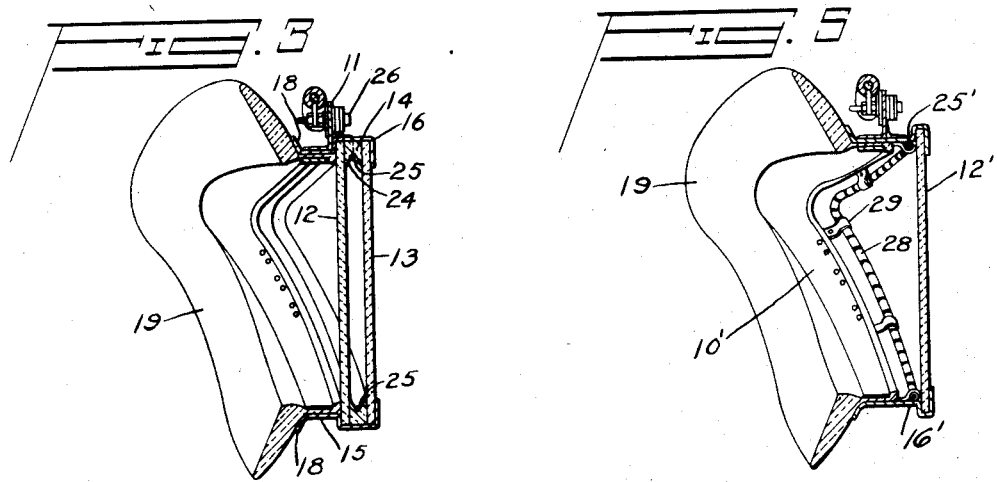
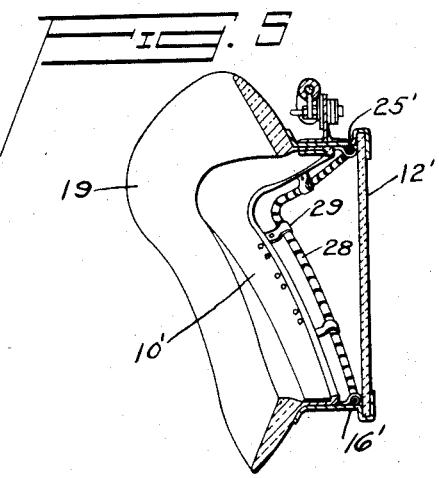
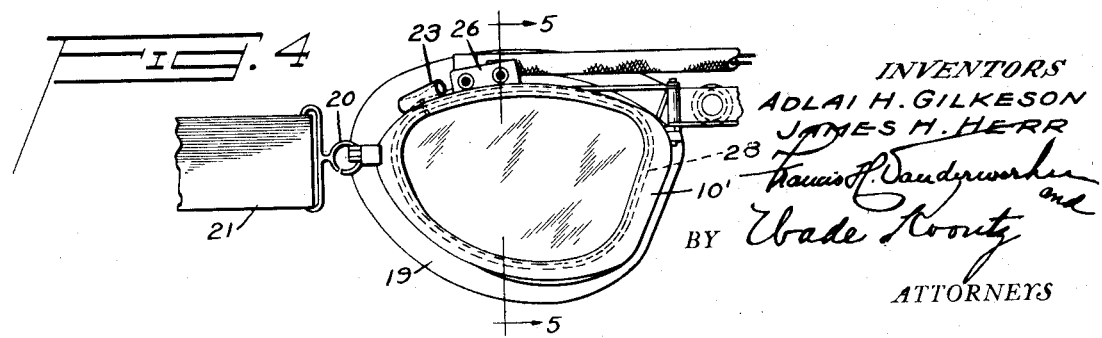
INVENTORS
ADLAI H. GILKESON
JAMES H. HERR
ATTORNEYS Patented June 26, 1934

1,963,990

UNITED STATES PATENT OFFICE 1,963,990

ELECTRICALLY HEATED GOGGLES

Adlai H. Gilkeson, Mount Clemens, Mich., and James H. Herr, Dayton, Ohio

Application August 24, 1932, Serial No. 630,260

4 Claims. (Cl. 2—14)

(Granted under the act of March 3, 1883, as amended April 30, 1928; 370 O. G. 757)

The invention described herein may be manufactured and used by or for the Government for governmental purposes, without the payment to us of any royalty thereon.

The present invention relates generally to goggles or eye protectors for aviators or the like and has for a primary object the construction of a goggle that is non-frosting or non-fogging in character so that clear vision therethrough will be obtained regardless of climatic conditions.

Another object of the present invention is to provide a goggle incorporating a heating element so positioned with respect to the lens of the goggle that a higher temperature is obtained and maintained on the face of the lens in order to prevent the formation of fog, ice, or moisture on the said lens.

Another object of the present invention is to provide a goggle of the double lens type having a heating element so disposed within the space between the lenses of the goggle that an even distribution of heat to both lenses will be obtained.

With these and other objects in view, the invention consists in various details of construction as more particularly hereinafter described and as shown in the accompanying drawing, in which:

Fig. 1 is a front elevation of an eye protector embodying the invention;

Fig. 2 is a top plan view thereof;

Fig. 3 is a sectional view taken on the line 3—3 of Fig. 1;

Fig. 4 is a front elevation of a modified form of the front elevation; and

Fig. 5 is a sectional view taken on the line 5—5 of Fig. 4.

Referring more particularly to the drawing, wherein corresponding parts are designated by like numerals throughout the several views, the eye protector herein illustrated includes as usual a pair of eye pieces or units 10, usually termed eye cups, connected by a nose piece or bridge 11. Each eye cup is provided with a pair of lenses 12 and 13 of glass or other suitable transparent material, which are separated by a rim spacer 14, as shown in Fig. 3, and a frame which extends about the eye of the wearer and by which the lenses of each eye cup are supported in desired position. Each frame comprises a main frame member 15 and a flanged lens holding rim 16. The frame member 15 is of a form corresponding to the shape of the lenses, usually approximately oval in form, and made of suitable sheet metal or other suitable rigid and strong material and of a suitable depth to support the lenses at the proper distance from the eyes of the wearer. When the lenses are curved in the direction of their major axis or horizontally when in position, as in the construction shown in Fig. 2, the frame member 15 and lens holding member 16 are correspondingly curved horizontally. The main frame members 15 have their rearward edges 17 formed to fit the face of the wearer as shown in Fig. 2.

The nose piece or bridge 11 heretofore mentioned, by which the two eye cups are connected is adjustable, as shown in Fig. 2, to permit a relative adjustment of the eye units or cups toward and away from each other so that the goggle may be suited to individuals having their visual axes more or less widely spaced.

The rearward edge of each frame member 15 may be provided with any suitable cushioning means adapted to bear against and make close contact with the face of the wearer, as shown in Figs. 3 and 5. The rearward or inner edges 18 of the frame members 15 are turned or flanged outwardly and the cushion strips 19 are secured to the inner faces of the frame members so as to seat against the flanged edges. Any suitable form of cushion strip may be employed, but we consider a cushion of suitable soft material, such as sponge rubber or the like of the correct shape to fit the contour of the face as most suitable for meeting the exacting requirements of aviator's goggles.

The outer end of each eye unit is provided with a swinging link or connecting piece 20 for receiving the ends of the usual head straps or bands 21, which extend about the head of the wearer to hold the goggles in position.

With goggles which fit closely against the face of the wearer, it is desirable and necessary to provide means for effectively ventilating the chambers within the eye cups both for comfort of the wearer and in order to avoid condensation of moisture on the inner side of the lens. Such means includes a series of small openings 22 in the lower wall of the frame members 15 adapted for admitting air into the cup chambers of the eye units 10. The upper walls of the frame members 15 are provided with Venturi tubes 23, which communicate with the cup chambers whereby currents of air will be caused to enter the chambers through the internal openings 22. The tubes 23 are so arranged that when worn upon the face of the wearer air currents in passing through the tubes 23 will create a draft through the cup chambers and in so doing the temperature of the air in the cup chambers is maintained as nearly as possible the same as the temperature of the outside atmosphere. As has been mentioned heretofore each eye unit 10 is provided with a pair of lenses 12 and 13, which are separated by a rim spacer 14 disposed adjacent the peripheral edges of the lenses. This rim spacer 14 is formed of insulating material as indicated in Fig. 3. As will be noted by referring to this figure, the rim spacer conforms substantially in shape to the contour of the lenses 12 and 13 and is provided with an internal V-shaped groove 24 adapted to receive and support a heating element 25, such as resistance wire or the like. The V-shaped groove 24 is equally spaced from the opposed inner faces of the lenses 12 and 13 and by providing a groove of this nature radiation of heat from the heating element directly to each lens will be obtained and an even distribution of heat thereto will be effected. Thus the temperature of the lenses will be materially increased to prevent the accumulation of sleet, snow or moisture thereon and clear vision will be maintained. Suitable connectors 26 and 27 are provided on each eye unit and insulated therefrom to which the heating elements in each eye unit may be electrically connected either in series or in parallel.

Figs. 4 and 5 show a modification of our invention. In this embodiment the eye units 10' are provided with a single lens 12' and having a heating element 25' disposed adjacent the peripheral edge of the lens 12' of each unit. In this embodiment of our invention the heating element 25' is insulated from the lens holding rim member 16' by means of insulating beads 28 which are secured to the lens holding member 16 through the use of a plurality of spaced metallic clips 29.

While we have shown several embodiments of the device of our invention in the accompanying drawing, it is to be understood that it is capable of various other modifications without departing from the spirit of our invention and it is desired therefore that only such limitations shall be imposed thereon as are required by the prior art or indicated by the appended claims.

We claim:

1. In an article of the class described, a frame member, a pair of lenses in said frame member, a spacer of insulating material interposed between said lenses for separating said lenses, said spacer being provided with an internal groove and an electric heating element disposed in said groove to thereby obtain direct radiation of heat to said lenses.

2. In an article of the class described, a frame member, a pair of lenses in said frame member, a spacer of insulating material interposed between said lenses for separating said lenses, said spacer being provided with an internal V-shaped groove centrally disposed relative to its side walls and an electric heating element disposed in said groove to thereby obtain an equal distribution of heat to each of said lenses.

3. In an article of the class described, a pair of lenses, a spacer for separating said lenses disposed circumferentially thereto to provide an air space between said lenses, a frame member including an inner flanged portion for one of said lenses and an outer flanged portion for the other of said lenses each portion being disposed in contiguous relation with respect to the outer surface of its respective lens and obtain a predetermined lens aperture and an electric heating element carried by said spacer intermediate said lenses and so disposed with respect to the flanged portions of said frame member as to lie outside the projected effective area of said lens aperture.

4. In an article of the class described, a pair of lenses, a spacer of insulation material for separating said lenses disposed circumferentially of the edges thereof to provide an air space between said lenses, a frame member including an inner flanged portion for one of said lenses and an outer flanged portion for the other of said lenses each portion being disposed in contiguous relation with respect to the outer surface of its respective lens and obtain a predetermined lens aperture and an electric heating element carried by said spacer and so disposed with respect to the flanged portions of said frame member as to lie outside the projected effective area of said lens aperture, said heating element being positioned on said spacer in a manner such that an even distribution of heat to said lenses is obtained.

ADLAI H. GILKESON.
JAMES H. HERR.